(12) United States Patent
Steinhoff et al.

(10) Patent No.: US 6,369,970 B1
(45) Date of Patent: Apr. 9, 2002

(54) MULTIPLE DISK WRITE METHOD AND DEVICE

(75) Inventors: Howard Steinhoff, Gilroy; David Drouin, Milpitas; Frank Morris, San Jose, all of CA (US)

(73) Assignee: Castlewood Systems, Inc., Pleasanton, CA (US)

( * ) Notice: Subject to any disclaimer, the term of this patent is extended or adjusted under 35 U.S.C. 154(b) by 0 days.

(21) Appl. No.: 09/321,978

(22) Filed: May 28, 1999

Related U.S. Application Data

(60) Provisional application No. 60/087,259, filed on May 29, 1998.

(51) Int. Cl.[7] .................................................. G11B 17/038
(52) U.S. Cl. ........................................ 360/75; 360/98.08
(58) Field of Search .......................... 360/75, 98.08, 360/77.02, 98.07, 99.08, 99.12; 29/729, 737, 603.03

(56) References Cited

U.S. PATENT DOCUMENTS

| | | | | |
|---|---|---|---|---|
| 4,831,470 A | * | 5/1989 | Brunnett et al. ............... 360/75 |
| 5,617,267 A | * | 4/1997 | Kawagoe et al. ........ 360/77.02 |
| 5,942,820 A | * | 8/1999 | Yoshida ............... 360/98.07 X |
| 5,973,879 A | * | 10/1999 | Raffetto et al. .......... 360/98.08 |
| 6,105,240 A | * | 8/2000 | Chuang et al. ............... 39/729 |
| 6,282,054 B1 | * | 8/2001 | Luo ........................ 360/98.08 |

FOREIGN PATENT DOCUMENTS

JP          59-94280         * 5/1984

* cited by examiner

*Primary Examiner*—David Hudspeth
*Assistant Examiner*—James L Habermehl
(74) *Attorney, Agent, or Firm*—Townsend and Townsend and Crew LLP

(57) ABSTRACT

A method of writing data to multiple disks on a servo track writing machine comprises the steps of providing a cylindrical disk stacking tool comprising a base and a spindle, loading a first disk onto the spindle in alignment with the base, loading a second disk onto said spindle in alignment with the first disk, placing the loaded disk stacking tool on the servo track writing machine, and simultaneously writing data to the disks with the servo track writing machine. As many disks as desired may be so written to. The disk stacking tool further includes a clamp for locking the disks in place.

20 Claims, 17 Drawing Sheets

MULTIPLE DISK WRITE METHOD AND DEVICE

CROSS-REFERENCES TO RELATED APPLICATIONS

This application claims priority from U.S. Provisional Application No. 60/087,259, filed May 29, 1998, which is hereby incorporated by reference for all purposes.

BACKGROUND OF THE INVENTION

The present invention generally relates to removable storage devices for electronic information. More particular, the present invention provides a technique including an apparatus and methods for writing to and manufacturing magnetic storage devices.

Consumer electronics including television sets, personal computers, and stereo or audio systems, have changed dramatically since their availability. Television was originally used as a stand alone unit in the early 1900's, but has now been integrated with audio equipment to provide video with high quality sound in stereo. For instance, a television set can have a high quality display coupled to an audio system with stereo or even "surround sound" or the like. This integration of television and audio equipment provides a user with a high quality video display for an action movie such as STARWARS™ with "life-like" sound from the high quality stereo or surround sound system. Accordingly, the clash between Luke Skywalker and Darth Vader can now be seen as well as heard in surround sound on your own home entertainment center. In the mid-1990's, computer-like functions became available on a conventional television set. Companies such as WebTV of California provide what is commonly termed as "Internet" access to a television set. The Internet is a world wide network of computers, which can now be accessed through a conventional television set at a user location. Numerous displays or "wet sites" exist on the Internet for viewing and even ordering goods and services at the convenience of home, where the act of indexing through websites is known as "surfing" the web. Accordingly, users of WebTV can surf the Internet or web using a home entertainment center.

As merely an example, FIG. 1 illustrates a conventional audio and video configuration, commonly termed a home entertainment system, which can have Internet access. FIG. 1 is generally a typical home entertainment system, which includes a video display 10 (e.g., television set), an audio output 20, an audio processor 30, a video display processor 40, and a plurality of audio or video data sources 50. Consumers have often been eager to store and play back pre-recorded audio (e.g., songs, music) or video using a home entertainment system. Most recently, consumers would like to also store and retrieve information, commonly termed computer data, downloaded from the Internet.

Music or audio have been traditionally recorded on many types of systems using different types of media to provide audio signals to home entertainment systems. For example, these audio systems include a reel to reel system 140, using magnetic recording tape, an eight track player 120, which uses eight track tapes, a phonograph 130, which uses LP vinyl records, and an audio cassette recorder 110, which relies upon audio cassettes. Optical storage media also have been recognized as providing convenient and high quality audio play-back of music, for example. Optical storage media exclusively for sound include a digital audio tape 90 and a compact disk 10. Unfortunately, these audio systems generally do not have enough memory or capacity to store both video and audio to store movies or the like. Tapes also have not generally been used to efficiently store and retrieve information from a personal computer since tapes are extremely slow and cumbersome.

Audio and video have been recorded together for movies using a video tape or video cassette recorder, which relies upon tapes stored on cassettes. Video cassettes can be found at the local Blockbuster™ store, which often have numerous different movies to be viewed and enjoyed by the user. Unfortunately, these tapes are often too slow and clumsy to store and easily retrieve computer information from a personal computer. Additional video and audio media include a laser disk 70 and a digital video disk 60, which also suffer from being read only, and cannot be easily used to record a video at the user site. Furthermore, standards for a digital video disk have not been established of the filing date of this patent application and do not seem to be readily establishable in the future.

From the above, it is desirable to have a storage media that can be used for all types of information such as audio, video, and digital data, which have features such as a high storage capacity, expandability, portability, and quick access capabilities. It is also desirable to have an efficient and economical system for writing information onto, or manufacturing such a storage media.

SUMMARY OF THE INVENTION

A method and apparatus for writing to multiple disks is provided for accurate placement and alignment yet high throughput.

According to one embodiment of the present invention, a method of writing data to multiple disks on a servo track writing machine comprises the steps of providing a cylindrical disk stacking tool comprising a base and a spindle, loading a first disk onto the spindle in alignment with the base, loading a second disk onto the spindle in alignment with the first disk, placing the loaded disk stacking tool on the servo track writing machine, and simultaneously writing data to the first and second disks with the servo track writing machine.

According to another embodiment of the present invention, a method includes the further steps of loading additional disks onto the spindle in alignment with other disks, and simultaneously writing data to all of the disks that are loaded onto the spindle.

According to yet another embodiment of the present invention, a disk stacking tool for placement on a servo track writing machine for writing data to multiple disks comprises a cylindrical spindle having a first diameter adapted to receive a plurality of the disks where the spindle includes a threaded bore in a top portion thereof, a cylindrical base coupled to the spindle and having a second diameter that is greater than the first diameter, where the base including a bottom hole for engagement with the servo track writing machine, a clamp having a detent for engaging the top portion of the spindle to secure the disks to the spindle, and a threaded bolt adapted to couple through the clamp to engage the threaded bore to lock the clamp in place.

DESCRIPTION OF THE SPECIFIC EMBODIMENTS

System Overview

Figure 1:
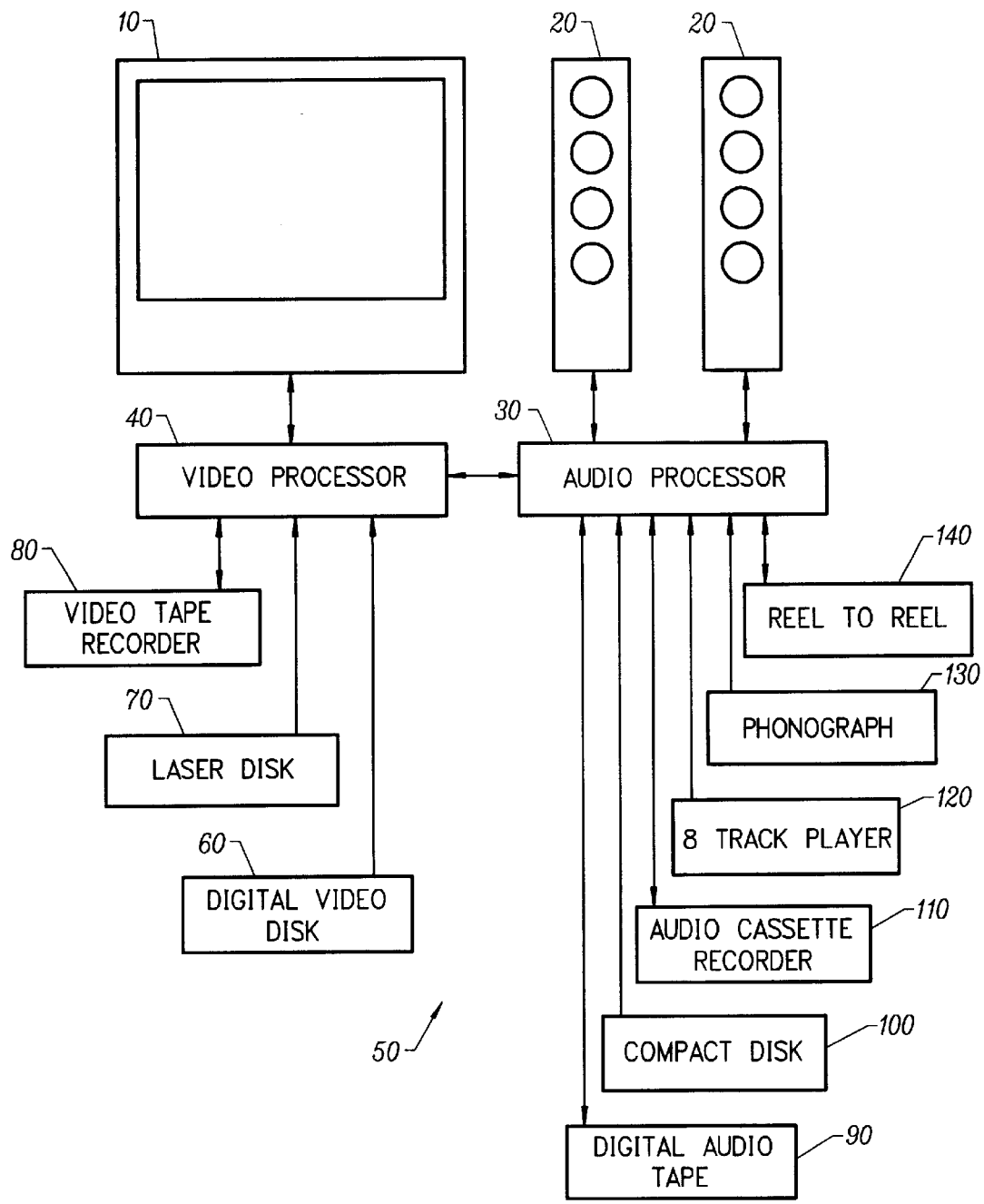
FIG. 1 illustrates a conventional audio and video configuration.
Figure 2:
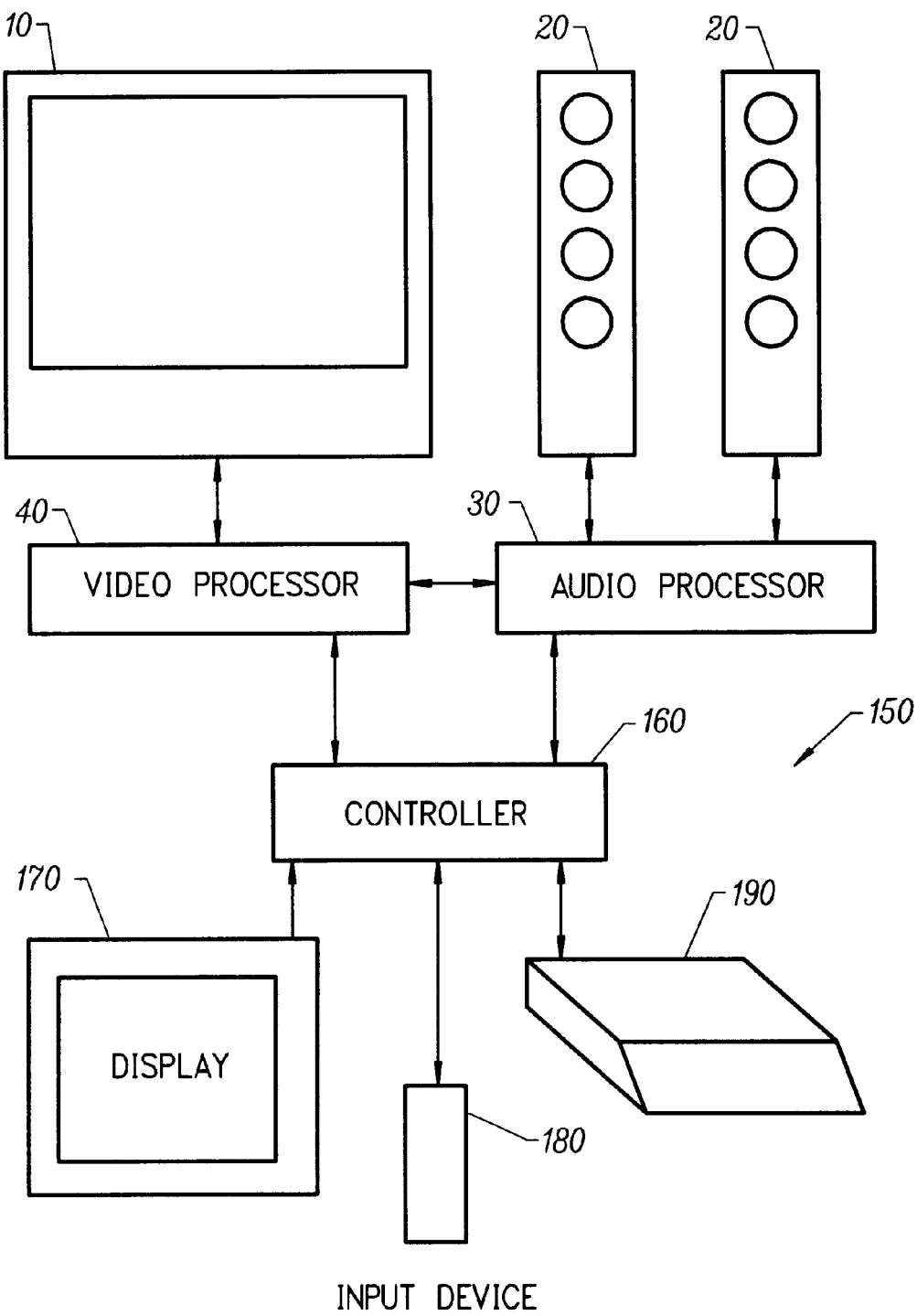
FIG. 2 illustrates a system according to an embodiment of the present invention.

FIG. 2 is a simplified block diagram of a system according to an embodiment of the present invention. This embodiment is merely an illustration and should not limit the scope of the claims herein. The system 150 includes the television display 10, which is capable of Internet access or the like, the audio output 20, a controller 160, a user input device 180, a novel storage unit 190 for storing and accessing data, and optionally a computer display 170. Output from system 150 is often audio and/or video data and/or data that is generally input into audio processor 30 and/or video processor 40.

Figure 5A:
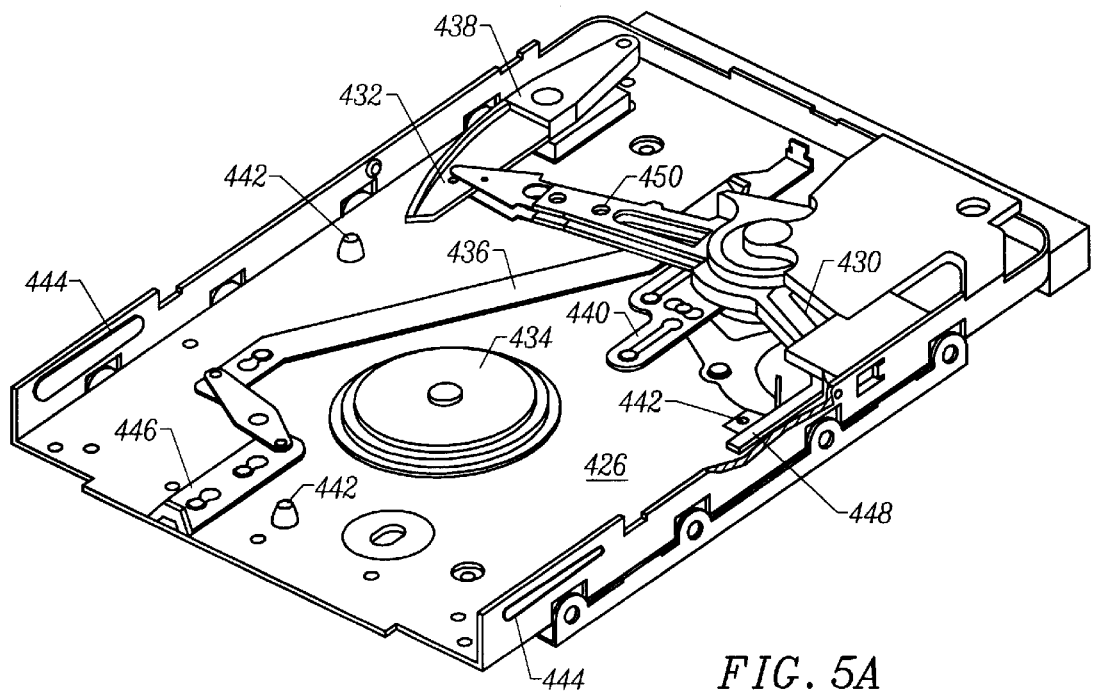
FIGS. 5A–5F illustrate simplified views and a storage unit for reading and/or writing from a removable media cartridge.
Figure 5B:
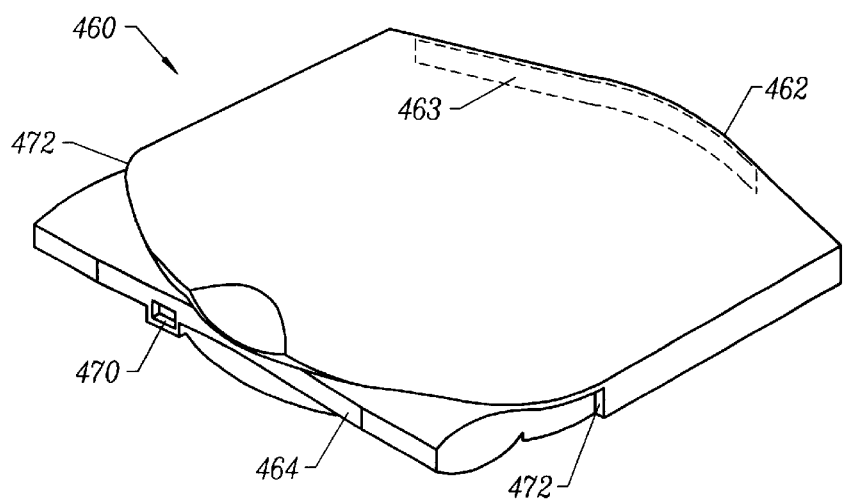
Figure 5C:
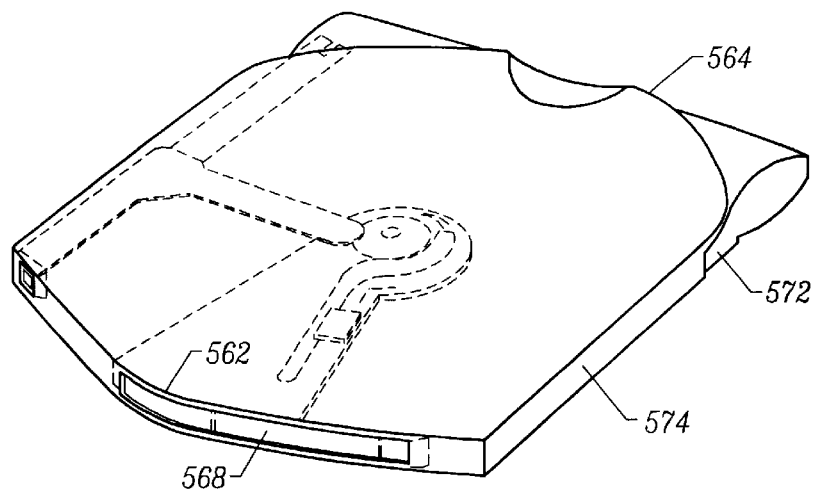

The storage unit includes a high capacity removable media cartridge, such as the one shown in FIGS. 5B & 5C, for example. The removable media cartridge can be used to record and playback information from a video, audio, or computer source. The cartridge is capable of storing at least 2 GB of data or information. The cartridge also has an efficient or fast access time of about 13 ms and less, which is quite useful in storing data for a computer. The cartridge is removable and storable. For example, the cartridge can store up to about 18 songs, which average about 4 minutes in length. Additionally, the cartridge can store at least 0.5 for MPEGII-2 for MPEGI full length movies, which each runs about 2 hours. Furthermore, the cartridge can be easily removed and stored to archive numerous songs, movies, or data from the Internet or the like. Accordingly, the high capacity removable media provides a single unit to store information from the video, audio, or computer. Further details of the storage unit are provided below.

Figure 3:
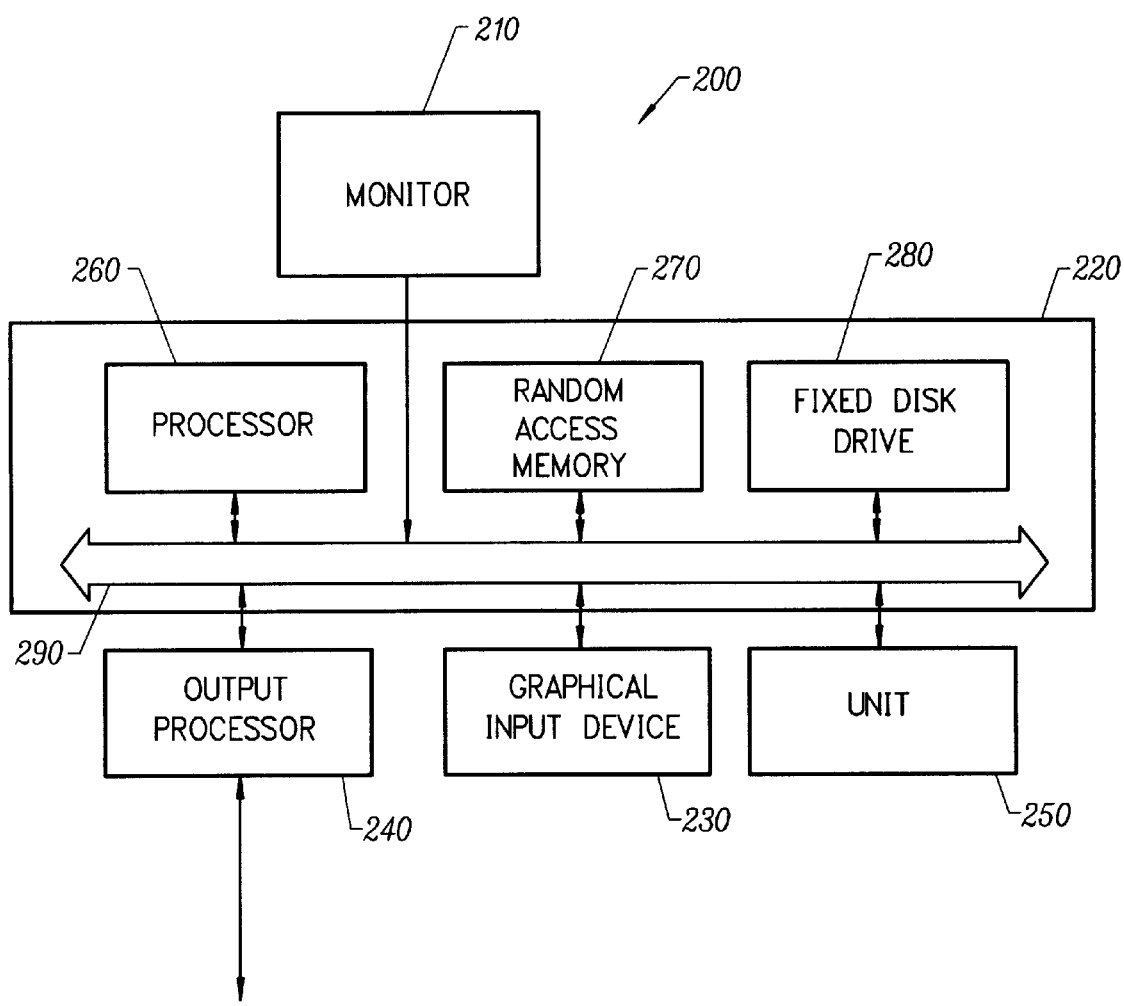
FIG. 3 includes a detailed block diagram of a system 200 according to an embodiment of the present invention.

In an alternative embodiment, FIG. 3 is a simplified block diagram of an audio/video/computer system 200. This diagram is merely an illustration and should not limit the scope of the claims herein. The system 200 includes a monitor 210, a controller 220, a user input device 230, an output processor 240, and a novel electronic storage unit 250 preferably for reading and writing from a removable media source, such as a cartridge. Controller 220 preferably includes familiar controller components such as a processor 260, and memory storage devices, such as a random access memory (RAM) 270, a fixed disk drive 280, and a system bus 290 interconnecting the above components.

User input device 230 may include a mouse, a keyboard, a joystick, a digitizing tablet, a wireless controller, or other graphical input devices, and the like. RAM 270 and fixed disk drive 280 are mere examples of tangible media for storage of computer programs and audio and/or video data, other types of tangible media include floppy disks, optical storage media such as CD-ROMs and bar codes, semiconductor memories such as flash memories, read-only-memories (ROMs), ASICs, battery-backed volatile memories, and the like. In a preferred embodiment, controller 220 includes a '586 class microprocessor running Windows95™ operating system from Microsoft Corporation of Redmond, Washington. Of course, other operating systems can also be used depending upon the application.

The systems above are merely examples of configurations, which can be used to embody the present invention. It will be readily apparent to one of ordinary skill in the art that many system types, configurations, and combinations of the above devices are suitable for use in light of the present disclosure. For example, in alternative embodiments of FIG. 2, for example, video display 10 is coupled to controller 220 thus a separate monitor 210 is not required. Further, user input device 230 also utilizes video display 10 for graphical feedback and selection of options. In yet other embodiments controller 220 is integrated directly into either audio processor 20 or video processor 30, thus separate output processor 240 is not needed. In another embodiment, controller 220 is integrated directly into video display 10. Of course, the types of system elements used depend highly upon the application.

Detailed Description

Figure 4A:
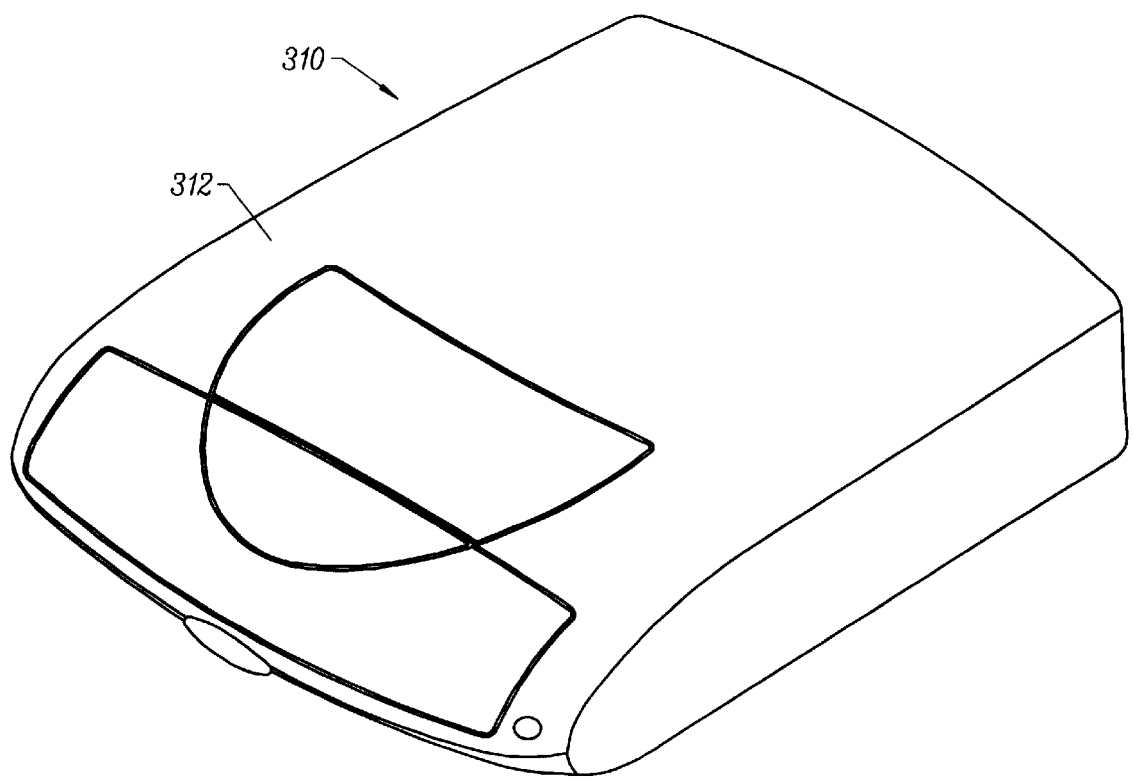
FIGS. 4A and 4B illustrate a storage unit according to an embodiment of the present invention.
Figure 4B:
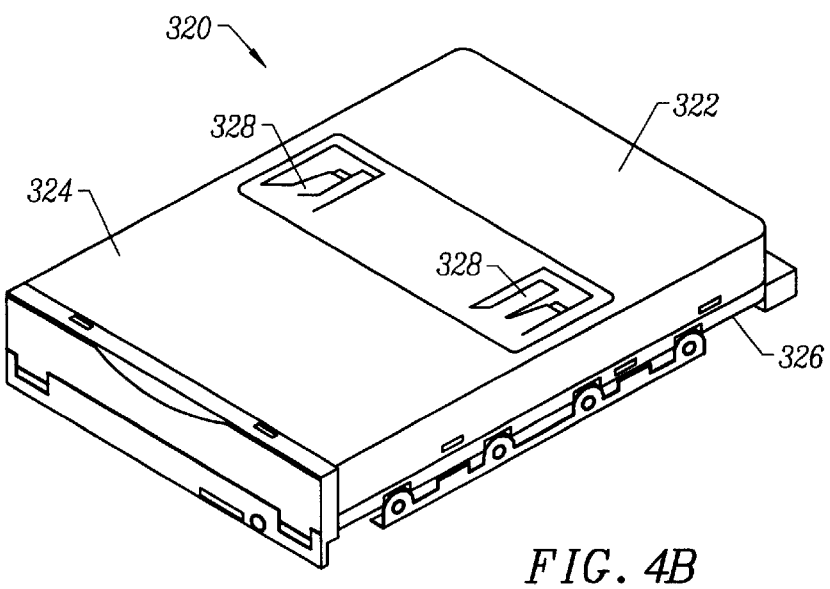

Referring now to FIGS. 4A and 4B, a storage unit according to the present embodiment can be an external disk drive 310 or internal disk drive 320 unit, which shares many of the same components. However, external drive 310 will include an enclosure 312 adapted for use outside a personal computer, television, or some other data manipulation or display device. Additionally, external drive 310 will include standard I/O connectors, parallel ports, and/or power plugs similar to those of known computer peripheral or video devices.

Internal drive 320 will typically be adapted for insertion into a standard bay of a computer. In some embodiments, internal drive 310 may instead be used within a bay in a television set such as HDTV, thereby providing an integral video system. Internal drive 320 may optionally be adapted for use with a bay having a form factor of 3 inches, 2.5 inches, 1.8 inches, 1 inch, or with any other generally recognized or proprietary bay. Regardless, internal drive 320 will typically have a housing 322 which includes a housing cover 324 and a base plate 326. As illustrated in FIG. 4B, housing 324 will typically include integral springs 328 to bias the cartridge downward within the receiver of housing 322. It should be understood that while external drive 310 may be very different in appearance than internal drive 320, the external drive will preferably make use of base plate 326, cover 324, and most or all mechanical, electromechanical, and electronic components of internal drive 320.

Many of the components of internal drive 320 are visible when cover 322 has been removed, as illustrated in FIG. 5A. In this exemplary embodiment, an actuator 450 having a voice coil motor 430 positions first and second heads 432 along opposed recording surfaces of the hard disk while the disk is spun by spindle drive motor 434. A release linkage 436 is mechanically coupled to voice coil motor 430, so that the voice coil motor effects release of the cartridge from housing 422 when heads 432 move to a release position on a head load ramp 438. Head load ramp 438 is preferably adjustable in height above base plate 426, to facilitate aligning the head load ramp with the rotating disk.

A head retract linkage 440 helps to ensure that heads 432 are retracted from the receptacle and onto head load ramp 438 when the cartridge is removed from housing 422. Head retract linkage 440 may also be used as an inner crash stop to mechanically limit travel of heads 432 toward the hub of the disk.

Base 426 preferably comprise a stainless steel sheet metal structure in which the shape of the base is primarily defined by stamping, the shape ideally being substantially fully defined by the stamping process. Bosses 442 are stamped into base 426 to engage and accurately position lower surfaces of the cartridge housing. To help ensure accurate centering of the cartridge onto spindle drive 434, rails 444 maintain the cartridge above the associated drive spindle until the cartridge is substantially aligned axially above the spindle drive, whereupon the cartridge descends under the influence of cover springs 428 and the downward force imparted by the user. This brings the hub of the disk down substantially normal to the disk into engagement with spindle drive 434. A latch 446 of release linkage 436 engages a detent of the cartridge to restrain the cartridge, and to maintain the orientation of the cartridge within housing 422.

A cartridge for use with internal drive 320 is illustrated in FIGS. 5B and 5C. Generally, cartridge 460 includes a front edge 462 and rear edge 464. A disk 666 (see FIG. 5F) is disposed within cartridge 460, and access to the disk is provided through a door 568. A detent 470 along rear edge 464 of cartridge 460 mates with latch 446 to restrain the cartridge within the receptacle of the drive, while rear side indentations 472 are sized to accommodate side rails 444 to allow cartridge 460 to drop vertically into the receptacle.

Figure 5D:
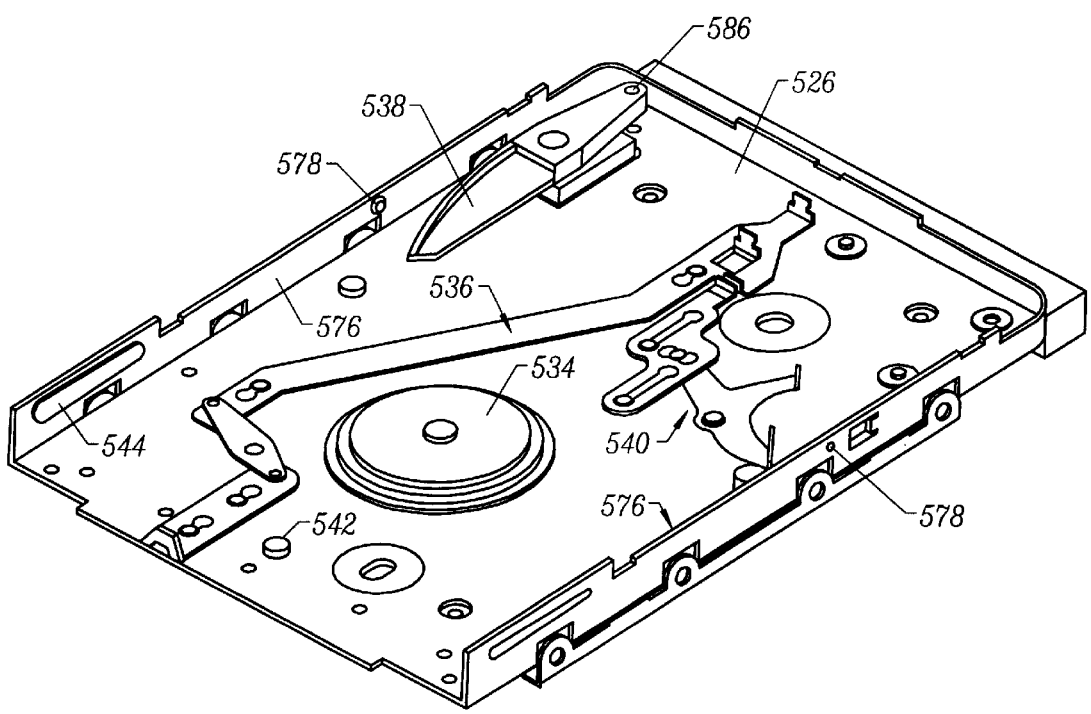
Figure 5E:
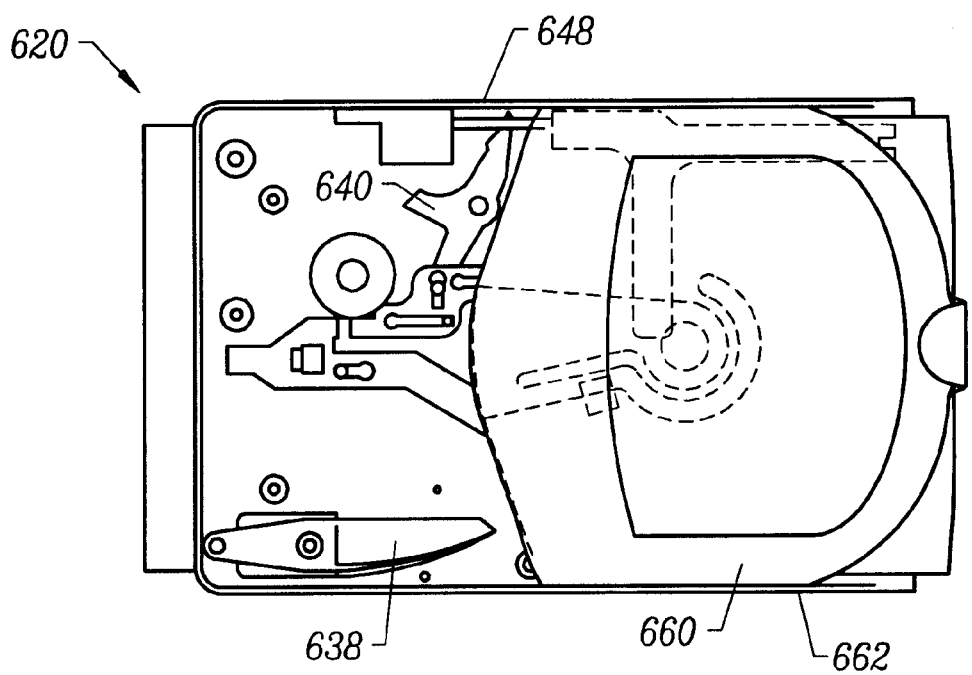

Side edges 574 of cartridge 460 are fittingly received between side walls 576 of base 526, as illustrated in FIG. 5D. This generally helps maintain the lateral position of cartridge 460 within base 426 throughout the insertion process. Stops 578 in sidewall 576 stop forward motion of the cartridge once the hub of disk 666 is aligned with spindle drive 534, at which point rails 444 are also aligned with rear indents 472. Hence, the cartridge drops roughly vertically from that position, which helps accurately mate the hub of the disk with the spindle drive.

Figure 5F:
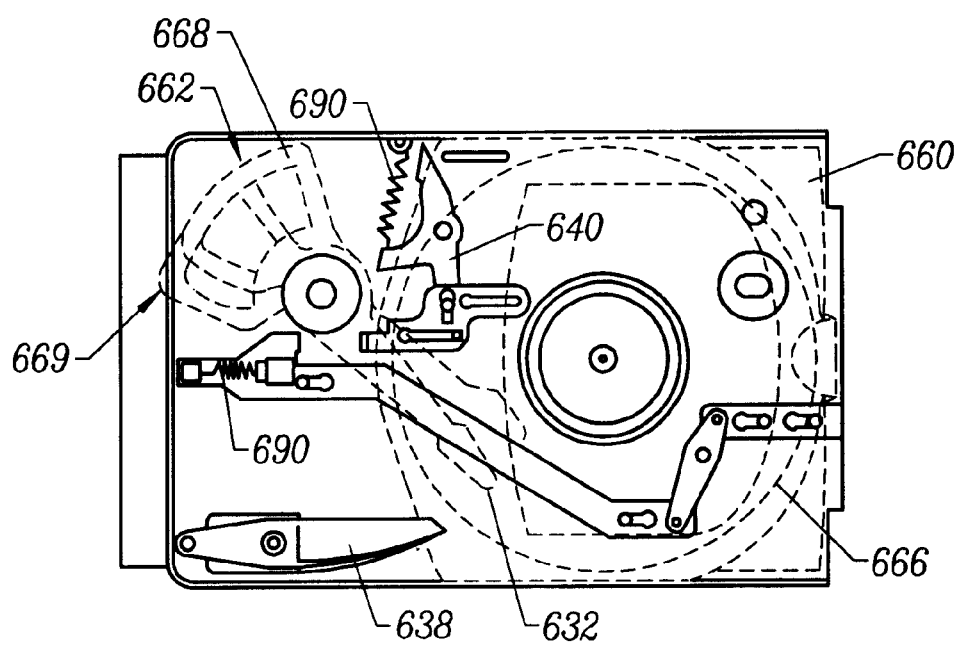

FIG. 5F also illustrates a typical first position 667 of VCM 668 and a typical second position 669 in response to different magnetic fluxes from a motor driver. As a result, read/write heads 632 are repositioned relative to disk 666 as shown.

Figure 6:
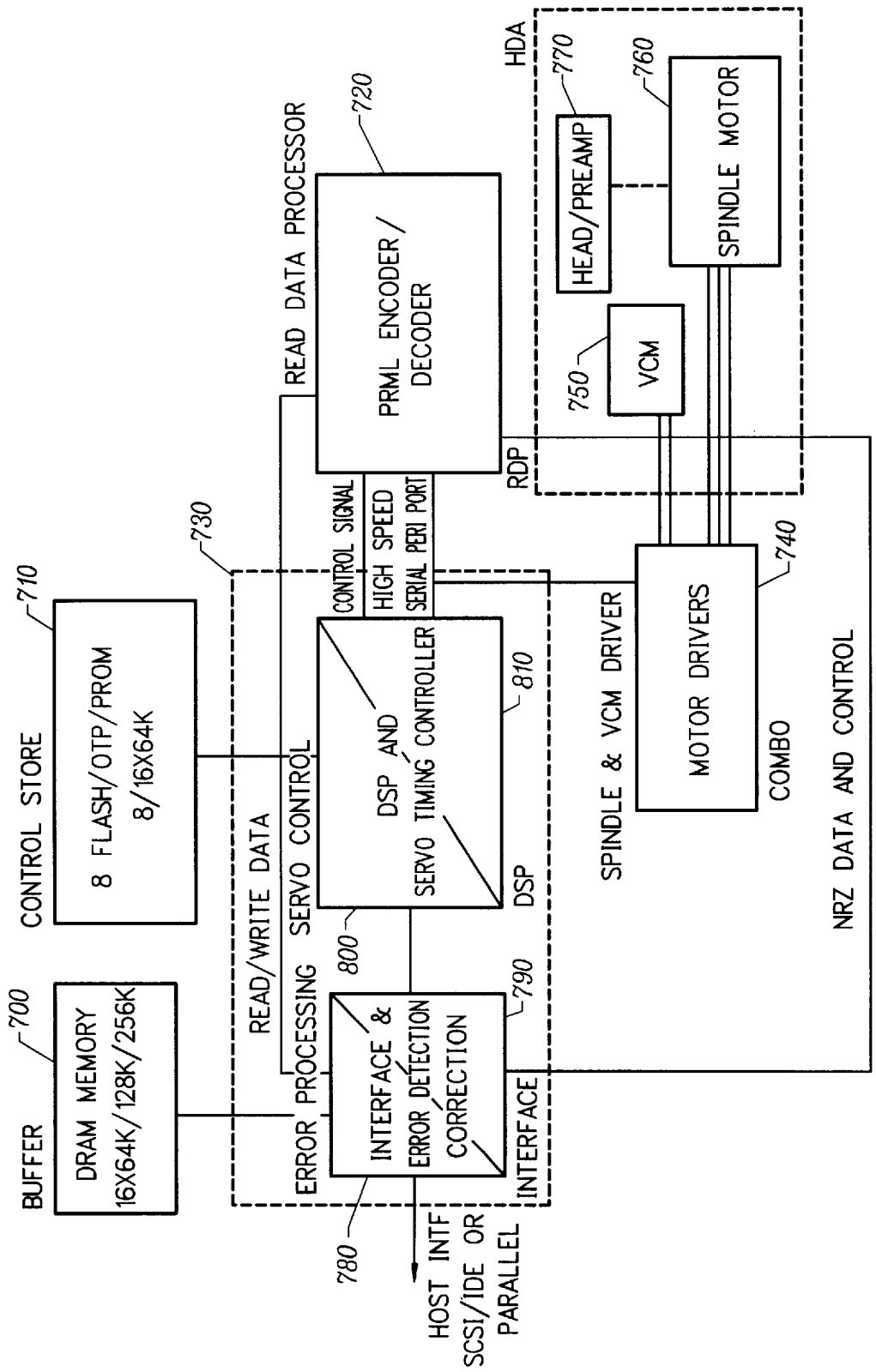
FIG. 6 illustrates a functional block diagram of an embodiment of the present invention.

FIG. 6 illustrates a simplified functional block diagram of an embodiment of the present invention. FIG. 6 includes a buffer 700, a control store 710, a read data processor 720, a controller 730, motor drivers 740, a voice coil motor 750, a spindle motor 760, and read/write heads 770. Controller 730 includes interface module 780, an error detection and correction module 790, a digital signal processor 800, and a servo timing controller 810. Voice coil motor 750 preferably corresponds to voice coil motor 430 in FIG. 5A, spindle motor 760 preferably corresponds to spindle drive motor 434 in FIG. 5A, and read/write heads 770 preferably correspond to read/write heads 432 on actuator arm 450 in FIG. 5A.

As illustrated in FIG. 6, buffer 700 typically comprises a conventional DRAM, having 16 bits×64K, 128K, or 256K, although other sized buffers are also envisioned. Buffer 700 is typically coupled to error detection and correction module 790. Buffer 700 preferably serves as a storage of data related to a specific removable media cartridge. For example, buffer 700 preferably stores data retrieved from a specific removable media cartridge (typically a magnetic disk), such as media composition and storage characteristics, the location of corrupted locations, the data sector eccentricity of the media, the non-uniformity of the media, the read and write head offset angles for different data sectors of the media and the like. Buffer 700 also preferably stores data necessary to compensate for the specific characteristics of each removable media cartridge, as described above. Buffer 700 typically is embodied as a 1 Meg DRAM from Sanyo, although other vendors' DRAMs may also be used. Other memory types such as SRAM and flash RAM are contemplated in alternative embodiments. Further, other sizes of memory are also contemplated.

Control store 710 typically comprises a readable memory such as a flash RAM, EEPROM, or other types of nonvolatile programmable memory. As illustrated, typically control store 710 comprises a 8 to 16 bit×64K memory array, preferably a flash RAM by Atmel. Control store 710 is coupled to DSP 800 and servo timing controller 810, and typically serves to store programs and other instructions, as well as data for DSP 800 and servo timing controller 810. Preferably, control store 710 stores access information that enables retrial of the above information from the media and calibration data.

Read data processor 720 typically comprises a Partial Read/Maximum Likelihood (PRML) encoder/ decoder. PRML read channel technology is well known, and read data processor 720 is typically embodied as a 81M3010 chip from MARVELL company. Other read data processors, for example from Lucent Technologies are contemplated in alternative embodiments of the present invention. As illustrated, read data processor 720 is coupled to error detection and correction module 790 to provide ECC and data transport functionality.

Interface module 780 typically provides an interface to controller 220, for example. Interfaces include a small computer standard interface (SCSI), an IDE interface, parallel interface, PCI interface or any other known or custom interface. Interface module 780 is typically embodied as an AK-8381 chip from Adaptec, Inc. Interface module 780 is coupled to error detection and correction module 790 for transferring data to and from the host system.

Error detection and correction module 790 is typically embodied as a AIC-8381B chip from Adaptec, Incorporated. This module is coupled by a read/write data line to read data processor 720 for receiving read data and for ECC. This module is also coupled to read data processor 720 by a now return to zero (NRZ) data and control now return to zero line. Other vendor sources of such functionality are contemplated in alternative embodiments of the present invention.

DSP 800 typically provides high-level control of the other modules in FIG. 6. DSP 800 is typically embodied as a AIC-4421A DSP from Adaptec, Inc. As shown, DSP 800 is coupled to read data processor 720 to provide control signals for decoding signals read from a magnetic disk. Further, DSP 800 is coupled to servo timing controller 810 for controlling VCM 750 and spindle motor 760. Other digital signal processors can be used in alternative embodiments, such as DSPs from TI or Motorola.

Servo timing controller 810 is typically coupled by a serial peripheral port to read data processor 720 and to motor drivers 740. Servo timing controller 810 typically controls motor drivers 740 according to servo timing data read from the removable media. Servo timing controller 810 is typically embodied in a portion of DSP 800.

Motor driver 740 is typically embodied as a L6260L Chip from SGS-Thomson. Motor driver 740 provides signals to voice coil motor 750 and to spindle motor 760 in order to control the reading and writing of data to the removable media. Spindle motor 760 is typically embodied as an 8 pole Motor from Sankyo Company. Spindle motor 760 typically is coupled to a center hub of the removable media as illustrated in FIG. 4 and rotates the removable media typically at rates from 4500 to 7200 revolutions per minute. Other manufacturers of spindle motor 760 and other rates of revolution are included in alternative embodiments.

VCM 750 is a conventionally formed voice coil motor. Typically VCM 750 includes a pair of parallel permanent magnets, providing a constant magnetic flux. VCM 750 also includes an actuator having a voice coil, and read/write heads. Read/write heads are typically positioned near the end of the actuator arm, as illustrated in FIG. 5A. The voice coil is typically electrically coupled to motor driver 740. VCM 750 is positioned relative to the magnetic disk in response to the amount of magnetic flux flowing through the voice coil. FIG. 5F illustrates a typical first position 667 of VCM 668 and a typical second position 669 in response to different magnetic fluxes from motor driver 740. As a result, read/write heads 632 are repositioned relative to disk 666 as shown.

In the preferred embodiment of the present embodiment the removable media cartridge comprises multiple removable magnetic disks. When reading or writing data upon the magnetic disks the read/write heads on the end of the actuator arm "fly" above the surface of the magnetic disk. Specifically, because the magnetic disks rotate at a high rate of speed, typically 5400 rpm, a negative pressure pulls the read/write heads towards the magnetic disks, until the read/write heads are typically 0.001 millimeters above the magnetic disks.

Figure 7:
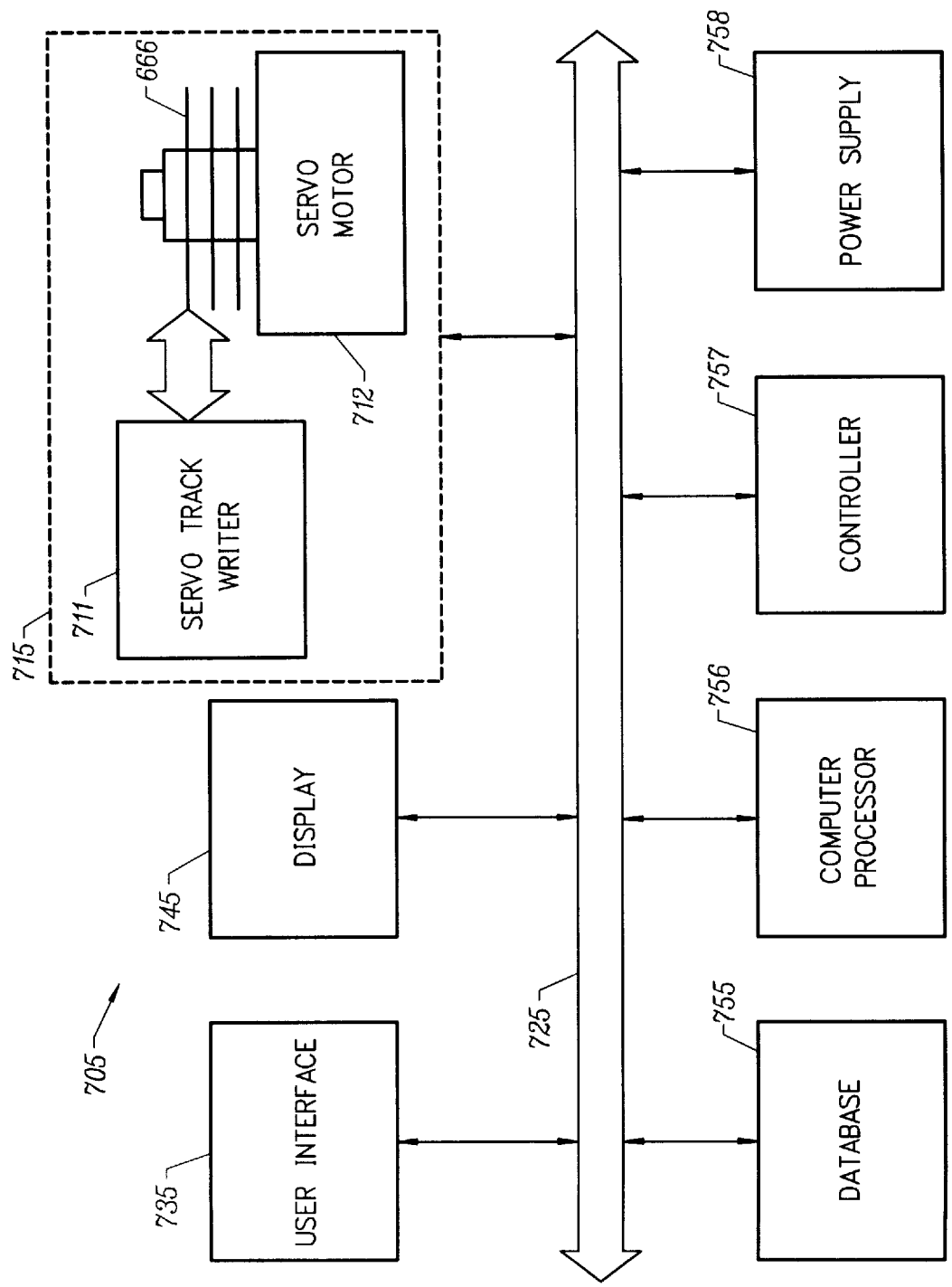
FIG. 7 illustrates a system used for manufacturing magnetic disks according to an embodiment of the present invention.

A system 705 for writing data to multiple magnetic disks is illustrated in a functional block diagram in FIG. 7. A servo track writing machine 715 for writing data onto tracks of multiple disks simultaneously, includes a servo track writer 711 and a servo motor 712. The motor 712 receives multiple disks 666 via a disk stacking tool, which will be described in detail below. The servo track writer 711 includes multiple track read/write heads for transferring data from a memory onto the disks 666, or reads data from the disks for transfer to other parts of the system 705. The servo track writing machine communicates instructions and data with the rest of the system via a data bus 725.

A servo track writing system 705 according to the invention is contemplated having a user interface 735, through which the system receives commands and instructions from a user. Operational information for the user is displayed in a display 745. Both the user interface 735 and display are communicatively coupled to the data bus 725. The system 705 also includes a database 755 having a memory for storing data to be written onto, or read from, the disks 666, for storing computer instructions, and for storing control information. The data may include servo track information in the form of audio or video signals.

A computer processor 756 is coupled to the data bus 725 and performs processing functions. The processor 756 is responsive to the user interface to execute commands, such as read or write operations. The processor may also execute data encryption/decryption algorithms, compression and expansion algorithms, and perform formatting on data to be written to or being read from the disks 666. A controller 757 is responsive to the computer processor for power and timing control to the rest of the system. The system 705 also includes a power supply 758 for providing electric power to the various functional blocks of the system.

Figure 8:
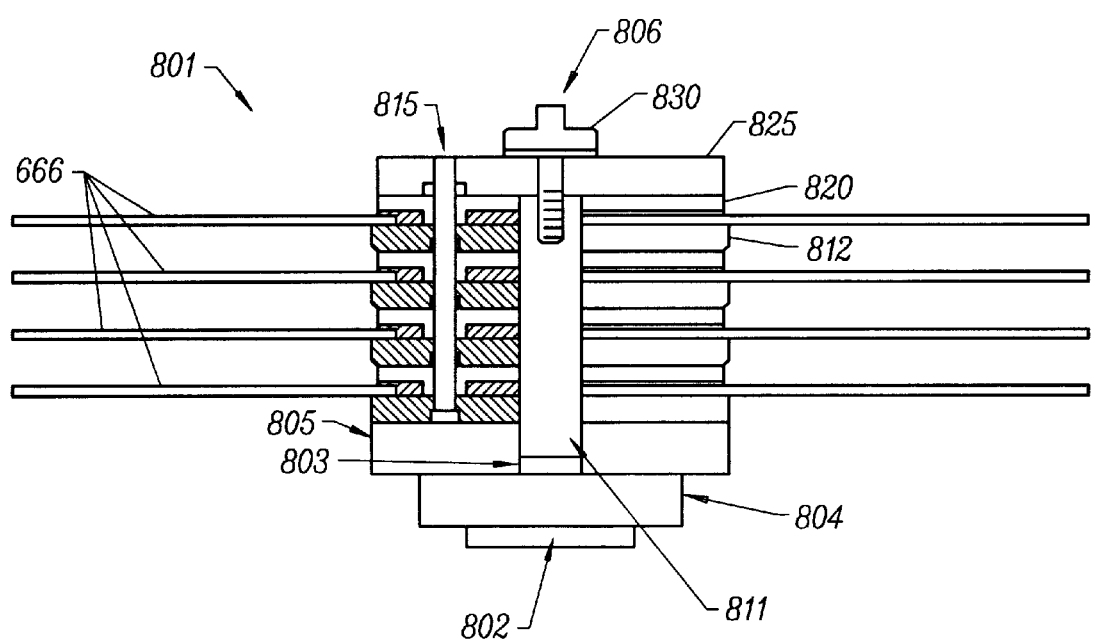
FIG. 8 illustrates a multiple disk stacking tool according to an embodiment of the present invention.

FIG. 8 illustrates a simplified side view of a multiple disk stacking assembly 801, according to an embodiment of the present invention, for use with the servo track writing system discussed in reference to FIG. 7. Stacking assembly 801 is shown here having four disks 666 stacked onto it, however it is contemplated that the assembly 801 may be configured for holding up to eight or more disks in alignment in various alternative embodiments. The stacking assembly 801 interfaces with a rotational servo motor drive via a grind fixture 804. Preferably, the grind fixture 804 is cylindrical and constructed of metal. The bottom end 802 of the grind fixture 804 is adapted to engage the motor drive of the servo track writing machine. On the top end of the grind fixture is a grind 803 that preferably has a smaller diameter than the body portion 801, and is sized to fit into a base 805 of a disk stacking tool 806. In a specific preferred embodiment, grind 803 has a diameter of 0.1968 inches, the same, within tolerances of ±0.0001 inches, of a spindle 811 of the disk stacking tool.

The disk stacking tool 806 has a base 805 and a spindle 811 mounted orthogonally and concentrically thereon. In a preferred embodiment, the spindle 811 and the base 805 are constructed from a single piece of metal. Preferably, both the spindle 811 and base 805 are cylindrical and concentric with the stacked disks 666. The disks are preferably spaced apart a distance of 5 mm. Each disk 666 has a center portion 812 defining an aperture adapted for slidably fitting onto the spindle 811. Intermediate to each pair of disks is a spacer 820. In the embodiment illustrated in FIG. 8, a spacer tool 820 is placed over each of the disks 666 in the stack, however, it should be apparent that a spacer tool 820 may be placed under each of the disks 666 as the disks are being loaded onto the disk stacker tool 806.

To secure the stacked disks 666 to each other and to the disk stacker tool, a clamp 825 is provided. By way of illustration only, FIG. 8 shows a threaded screw 830 received into the clamp 825 to lockably engage the clamp to the topmost disk 666. However, it is envisioned that the clamp may also lock to a spacer tool, or the top of the spindle 811. Also shown with reference to FIG. 8 is an alignment mechanism 815, extending through the disks 666 to engage the disk stacker spindle 805. In one embodiment the alignment mechanism 815 is not necessary to for alignment, but may be provided to add additional safeguards against possible relative rotational movement among the stacked disks, or relative movement between the disks and the spindle.

Figure 9:
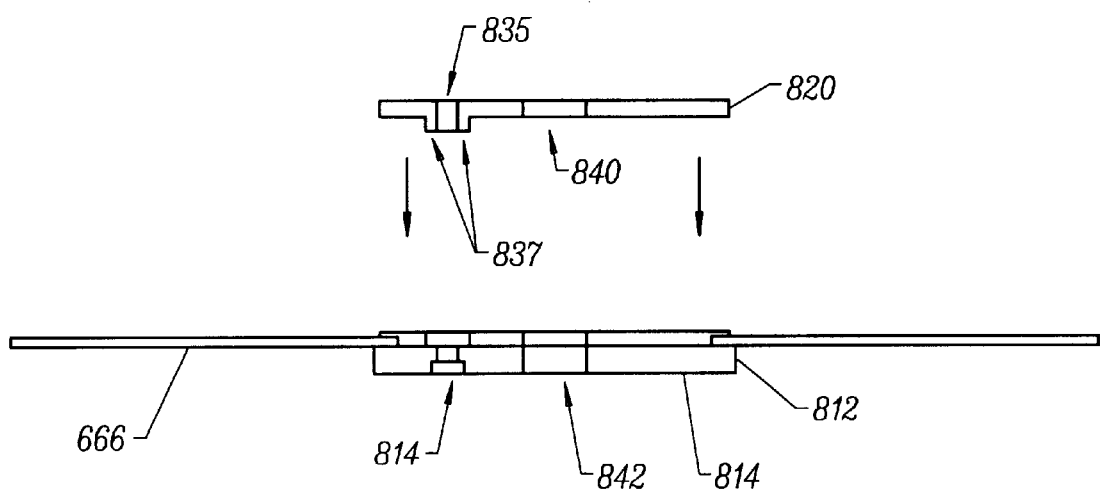
FIG. 9 is a simplified cross-sectional illustration of a single disk and spacer tool according to an embodiment of the present invention.

FIG. 9 illustrates the spacer 820 according to an embodiment of the present invention. The spacer has an aperture 835 for receiving a locking mechanism, the alignment mechanism, or the like. To engage with the disk 666, there is provided a latch 837 that, when the spacer is engaged with the disk, inhibits relative rotational movement between the spacer 820 and the disk 666. In the center of the cylindrical spacer is an aperture 840 through which the spindle portion 811 is received.

Alternatively or in cooperation with the spacer tool 820, each disk may include a spacer in alignment with the center portion 812. The center portion 812 is preferably sized to correspond with a diameter of the spacer 820 and the base 805. The center portion 812 also includes a first aperture 842 for receiving the spindle 811, and a second aperture 814 for receiving a locking or alignment mechanism. The second aperture 814 may be repeated in increments of 120 degrees proximate to a peripheral portion on an intermediate top area of the disk center portion 812. The apertures 814 each may also have a recessed inner portion adapted to receive an end portion of either the alignment mechanism or the locking mechanism.

Figure 10:
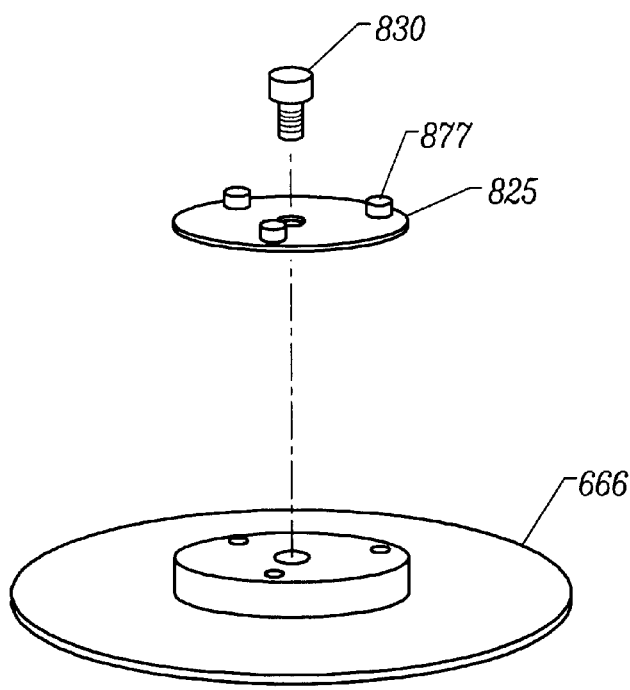
FIG. 10 illustrates a clamp for use with an embodiment of the present invention.

Referring now to FIG. 10, a clamp 825 is shown for use with an embodiment of the present invention. The clamp 825 has three receiving apertures 827 each adapted for receiving a locking mechanism 830. The receiving apertures 827 are spaced at 120 degree intervals around the periphery of the circular clamp, to correspond with similarly spaced apertures 814 in both the disk center portion 812 and the spacer 820.

Figure 11:
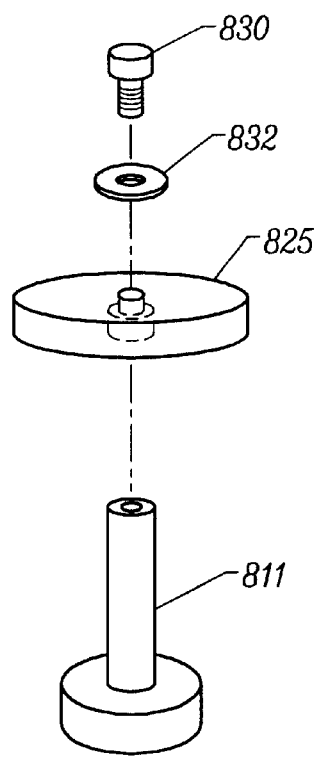
FIG. 11 illustrates an alternative embodiment of the clamp for the disk stacking tool according to the present invention.

FIG. 11 illustrates an alternative embodiment of the clamp 825 for the disk stacking tool according to the present invention. In the embodiment shown in FIG. 11, the clamp 825 has a concentric center detent for receiving the top portion of the spindle 811. In the center through the recess and the clamp 825, there is an aperture for receiving a screw 830 or similar locking device. A washer 832 may also be employed for providing additional pressure down on the clamp 825 to lock the assembly together.

Figure 12:
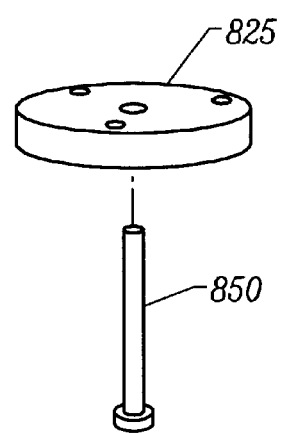
FIG. 12 illustrates an alignment mechanism according to an embodiment of the present invention.

FIG. 12 illustrates an alignment mechanism 840 according to an embodiment of the present invention. For additional security, the alignment mechanism 840 may be inserted into a special aperture provided in all of the disks and spacers mounted on the spindle. The base of the alignment mechanism may be larger in order to be received and engageable within the aperture 814 of the disk center portion 812, discussed above. However, because the disk stacking tool will spin at high speeds, the alignment tool may be omitted.

Figure 13A:
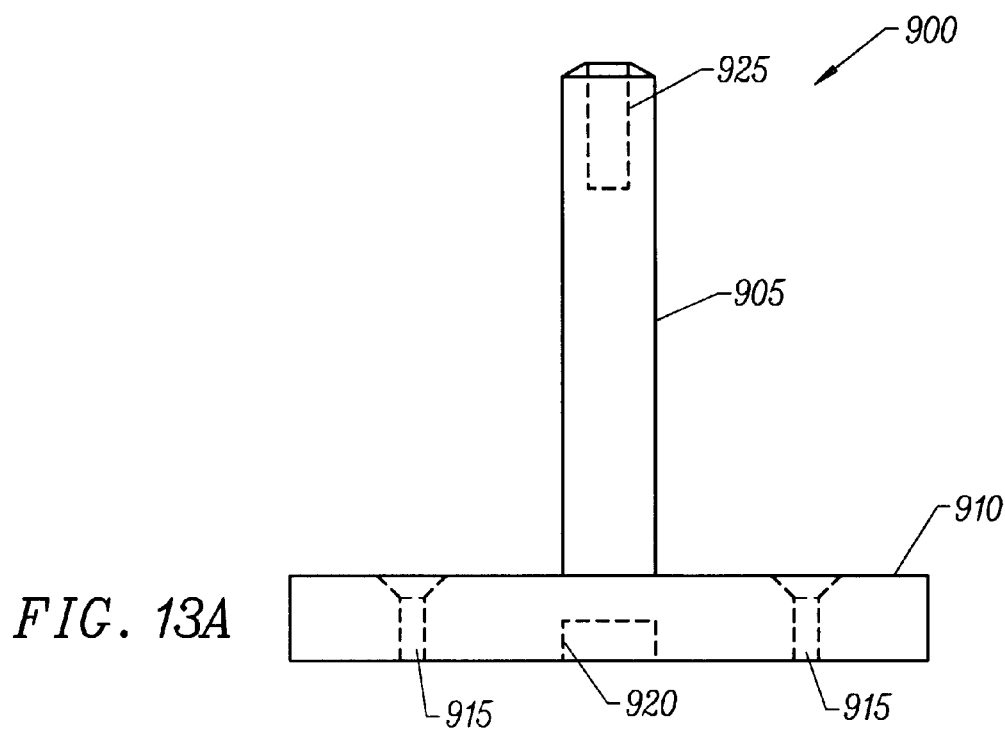
FIGS. 13A and 13B are simplified side and top views, respectively, of a cylindrical disk stacking tool according to the invention.
Figure 13B:
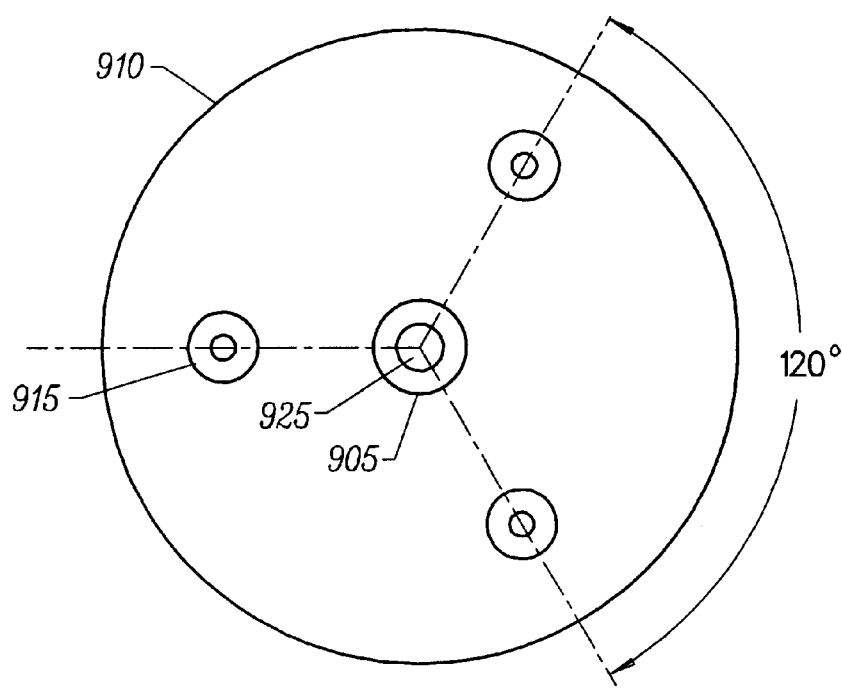

FIGS. 13A and 13B are simplified side and top views, respectively, of a cylindrical disk stacking tool 900. With reference to FIG. 13A, tool 900 includes a spindle 905 and a base 910. In a specific preferred embodiment, the spindle has a diameter of 0.1968 inches (5 mm), with a tolerance of ±0.0001 inches. The spindle's height depends on the number of disks to be stacked onto the tool 900. For four disks, the spindle preferably has a height of 0.9±005 inches. For three disks, the spindle preferably has a height of 0.7±005 inches, and for two disks a preferred height of 0.5±005 inches. As stated before, it is contemplated for the tool 900 to be loaded with up to eight disks, and therefore in the preferred embodiment each additional disk would add substantially 0.2 inches to the height of the spindle. Further, spacers may be employed when less than the full allowable number of disks are loaded onto the spindle.

The spindle further includes a threaded bore 925 perpendicularly into the top of the spindle 905. In an embodiment, the bore extends into the spindle at a depth of approximately 0.25 inches. The top may also be chamfered portion to a 45 degree angle and a height of 0.005 inches. The spindle 905 is coupled to the center of the base 910 and is concentrically aligned thereon. The base includes screw holes 915 that are preferably suitable for 4–40 type flat head screws, to allow the head of the screw to be below the top surface of the base. In the bottom surface of the base is a hole 920 for coupling with a grind or the servo track motor. The bottom hole preferably has a diameter of 0.1968 inches, corresponding to the spindle diameter for ease of construction, and is 0.070 inches in depth. The entire base is preferably 1.210±0.01 (31 mm) inches in diameter.

FIG. 13B shows a top view of the tool 900 illustrating placement and alignment of the screw holes 915, preferably numbering three and in spaced increments of 120 degrees around an intermediate perimeter of the base 905. In an embodiment, screw holes 915 are placed at a distance of 0.90 inches from the center of the base.

Figure 14A:
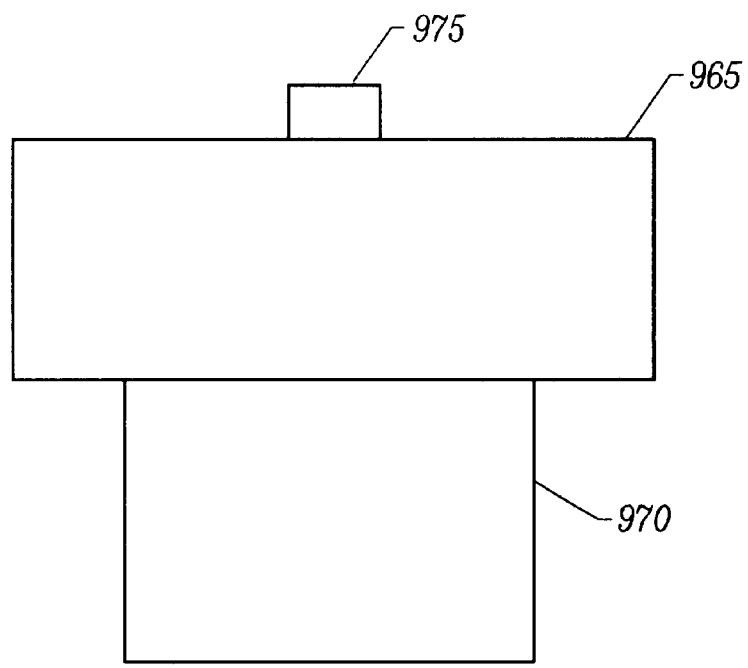
FIGS. 14A and 14B are simplified side and top views, respectively, of a grind fixture according to the invention.
Figure 14B:
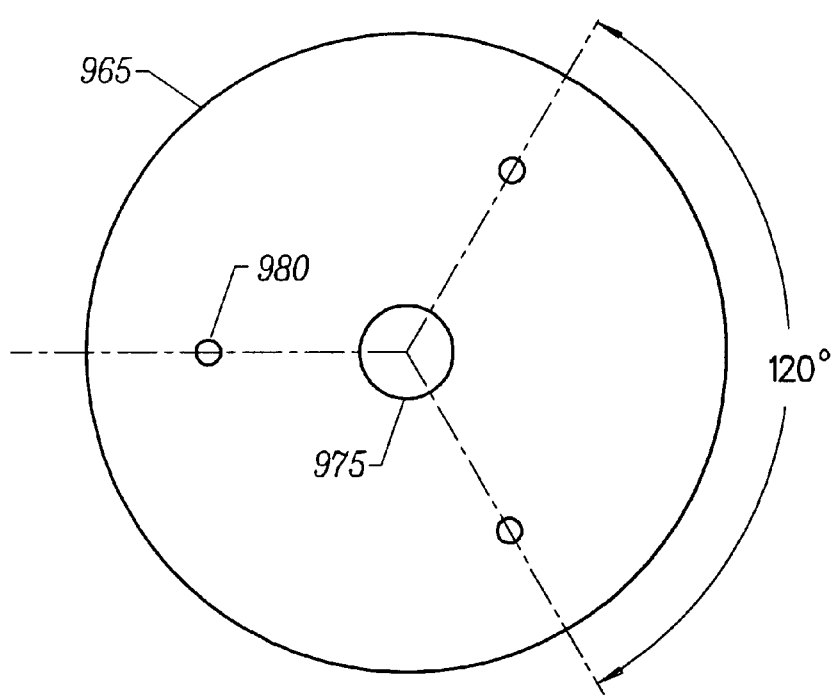

FIGS. 14A and 14B are simplified side and top views, respectively, of a grind fixture 960. FIG. 14A shows a cylindrical grind fixture including a top end 965 and a bottom end 970. Extending up from the center of the top end is a grind 975, sized and adapted to tightly fit into the hole 920 in the base of the stacking tool shown in FIG. 13A. The top end is preferably 1.210 inches in diameter to correspond with the diameter of the base of the stacking tool. The bottom end 970 is configured to engage a servo motor for providing rotational movement to the grind fixture 960 and the coupled stacking tool 900.

FIG. 14B shows a top plan view of the grind fixture 960 to illustrate the placement and position of the screw holes 980, that correspond to the screw holes in the base of the stacking tool. Preferably, screw holes are adapted to accommodate 4–40 flat head screws, and are spaced 120 degrees apart on the top surface of the top end.

Figure 15:
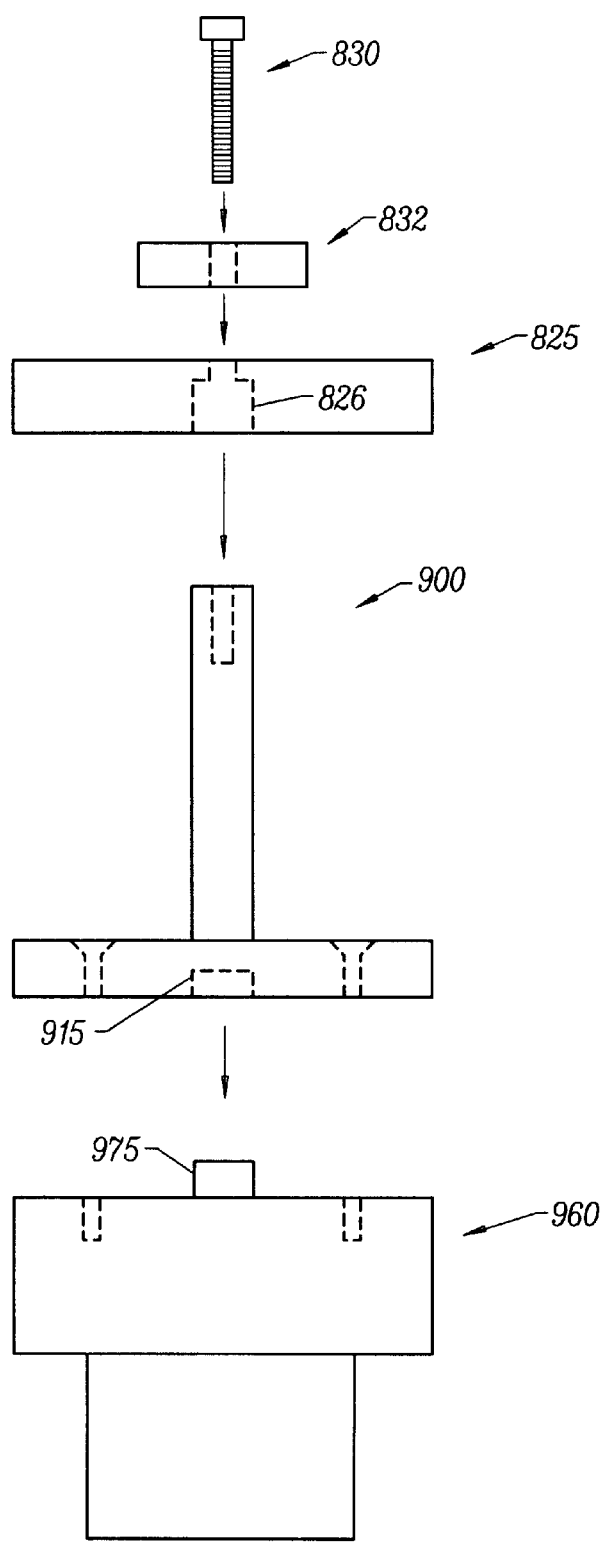
FIG. 15 shows an exploded view of a disk stacking tool according to the invention.

FIG. 15 shows an exploded view of a disk stacking assembly according to an embodiment of the invention. The disk stacking tool 900 fits onto the grind fixture when the grind 975 lockably engages a hole 915 in the disk stacking tool. Flat head screws (not shown) secure the two pieces together. Magnetic data storage disks (not shown) are loaded onto the spindle, one on top of the other, and aligned as closely as possible both horizontally and concentrically. A clamp 825 fits over the top of the spindle of the stacking tool at a detent 826. A spacer or washer 832 may be placed over the clamp 825. The clamp and washer are fixed to the spindle, and the entire assembly locked together, when a threaded bolt is placed through the clamp and into the threaded bore of the spindle. All of the pieces described herein may include 45 degree chamfered or beveled edges for strength and stability.

Figure 16:
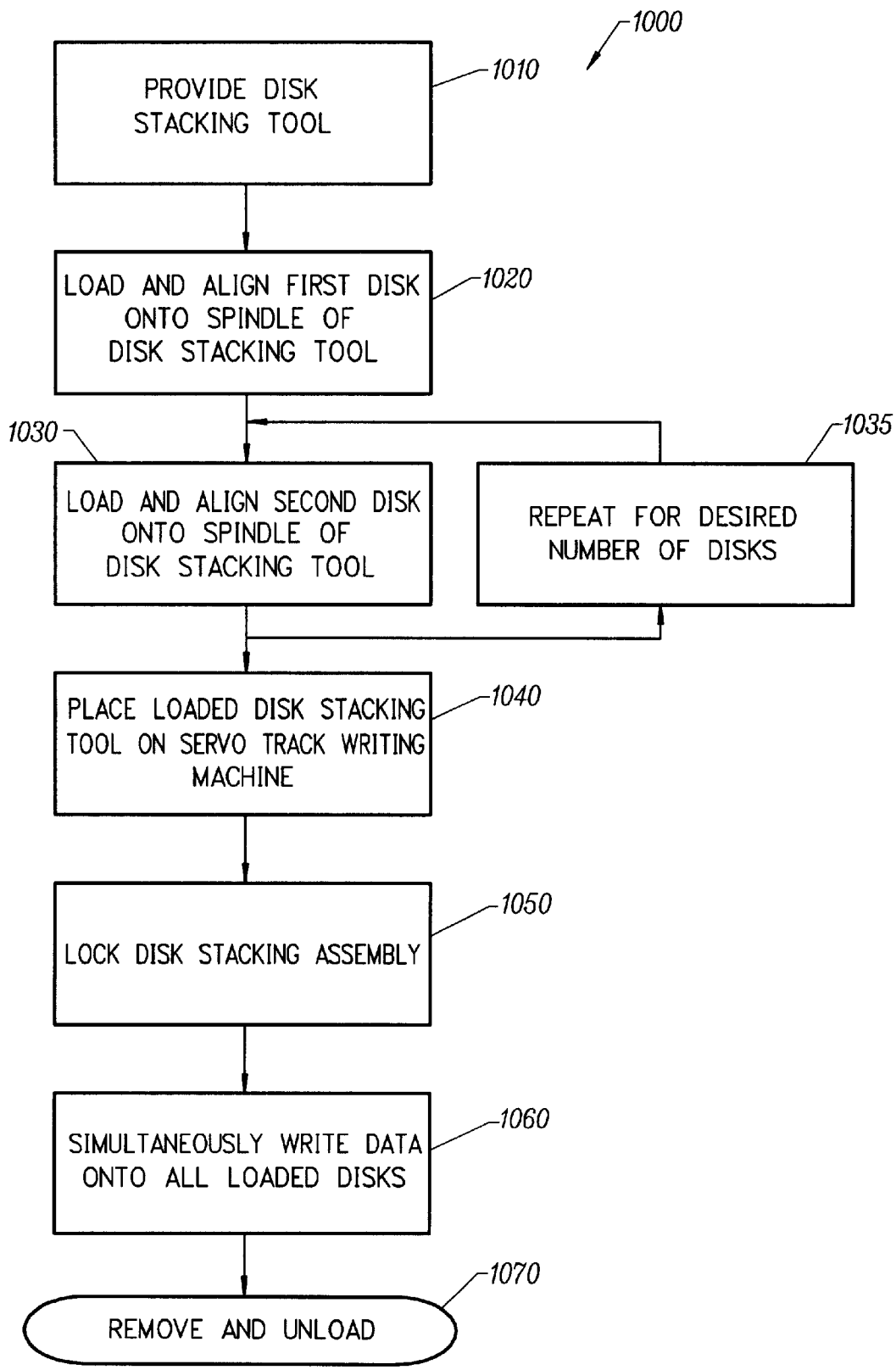
FIG. 16 is a flowchart of a method of writing data to multiple disks according to an embodiment of the invention.

FIG. 16 is a flowchart of a method 1000 of writing data to multiple disks according to an embodiment of the invention. At step 1010, a disk stacking tool as described above is provided. At step 1020, a first disk is loaded onto the spindle of the disk stacking tool, and aligned preferably with the base of the disk stacking too. At step 1030, a second disk is loaded onto the spindle of the disk stacking tool, and aligned with the first disk. The disks are of the type described in greater detail above. At step 1035, the process of loading and aligning additional disks is repeated until a desired number of disks are loaded onto the disk stacking tool.

At step 1040, the loaded disk stacking tool is placed onto the servo track writing machine. At step 1050, which may occur anytime after the desired number of disks are loaded, the disk stacking assembly is locked together with a clamp and locked into place in relation to the servo motor. At step 1060, the servo track writing machine will write data onto all of the loaded disks simultaneously.

It is contemplated that while a fully loaded assembly may be written to, another disk stacking tool may be undergoing the previously described steps at the same time, thereby increasing throughput of writing data onto multiple disks. When writing is completed, at step 1070 the disk stacking tool may be removed from the servo track writing machine, and unloaded if desired.

Figure 17:
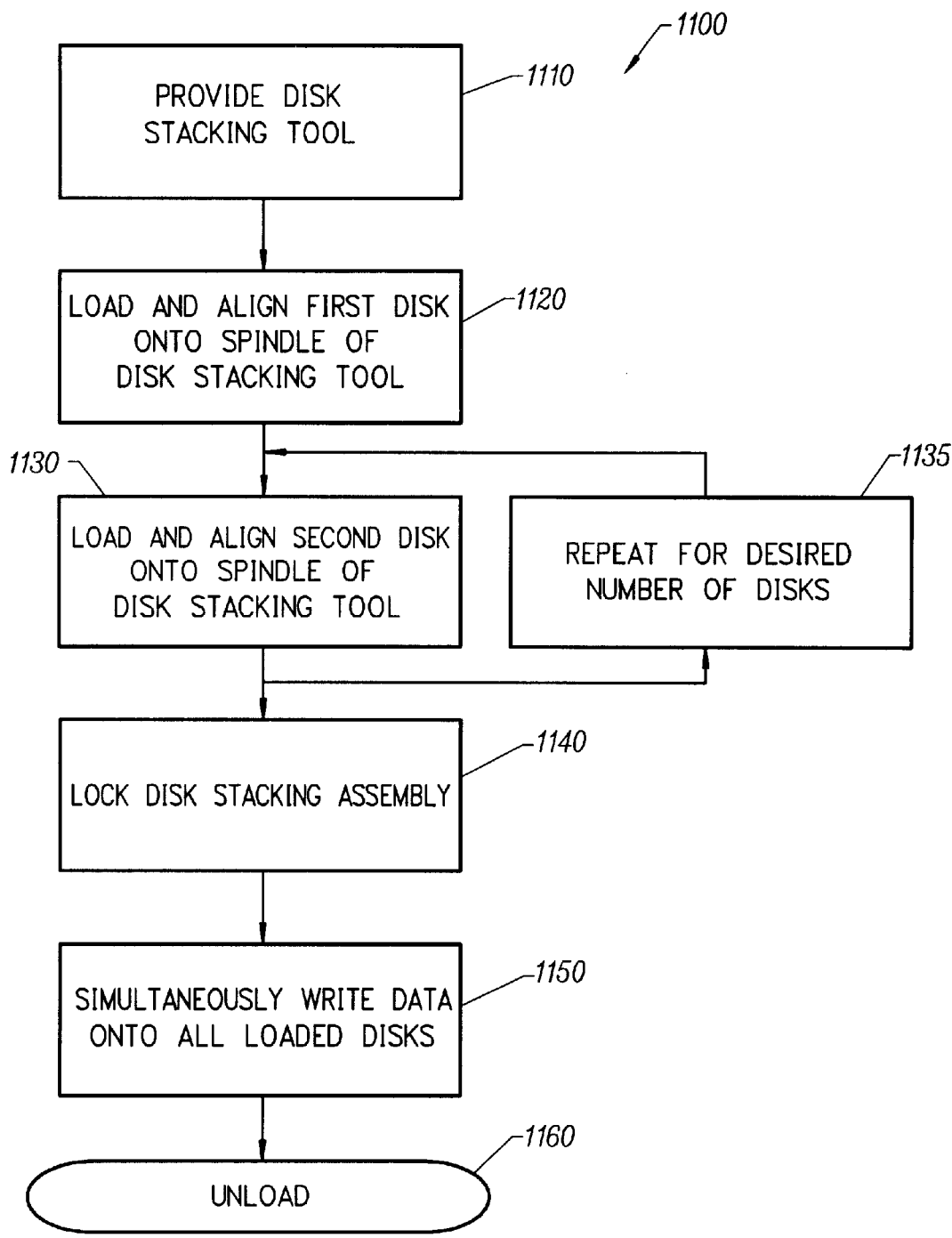
FIG. 17 is a flowchart of a method of writing data to multiple disks according to an alternative embodiment of the invention.

FIG. 17 is a flowchart of an alternate method 1100 of writing data to multiple disks according to an embodiment of the invention. At step 1110, a disk stacking tool is provided on a servo track writing machine. The disk stacking tool may already be coupled to a grind assembly as discussed above, or coupled to the servo motor drive. At step 1120, a first disk is loaded onto the spindle of the disk stacking tool and aligned with the tool, preferably the base. At step 1130, a second disk is likewise loaded and aligned, preferably with the first disk, and the process may be repeated for any desired number of disks, as shown by step 1135. At step 1140, upon loading all of the desired number of disks, the assembly will be locked.

At step 1150, each of the loaded disks are written to by the servo track writing machine. By placing the disks onto the disk stacking tool in this fashion, when the disk stacking tool is already coupled to the servo track writing machine, alignment accuracy may be improved. As shown above, the dimensions of the pieces of the invention are preferably exact, with minimal tolerances. Therefore, the disks may be accurately aligned for fast and accurate writing processes.

Conclusion

In the foregoing specification, the invention has been described with reference to specific exemplary embodiments thereof. Many modifications or changes re readily envisioned in alternative embodiments of the present invention discussed, for example, in the embodiments above.

The presently claimed inventions may also be applied to other areas of technology such as mass storage systems for storage of video data, audio data, textual data, program data, or any computer readable data in any reproducible format. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of writing data to multiple disks on a servo track writing machine, the method comprising the steps of:
    providing a cylindrical disk stacking tool comprising a base and a spindle;
    loading a first disk onto said spindle in alignment with said base;
    loading a second disk onto said spindle in alignment with said first disk;
    placing said loaded disk stacking tool on said servo track writing machine; and
    simultaneously writing data to said disks with said servo track writing machine.

2. The method of claim 1 further comprising the step of loading a third disk onto said spindle in alignment with said second disk.

3. The method of claim 2 further comprising the step of loading a fourth disk onto said spindle in alignment with said third disk.

4. The method of claim 3 further comprising the step of loading up to four more disks, one on top of another, onto said spindle in alignment with each other.

5. The method of claim 1 wherein said placing steps include positioning a spacer tool onto each disk to concentrically align each said disk.

6. The method of claim 1 further comprising the step of clamping said disks to said disk stacking tool to inhibit relative rotational movement between said disks and said disk stacking tool.

7. The method of claim 1 wherein said spindle has a diameter of 0.1968 inches with a tolerance of ±0.0001 inches.

8. The method of claim 1 wherein said base includes a bottom hole for coupling to a grind that engages a servo track writing machine motor.

9. The method of claim 8 wherein said hole has a diameter of 0.1968 inches with a tolerance of ±0.0001 inches.

10. The method of claim 1 wherein said spindle has a diameter of 5 mm or less.

11. The method of claim 10 wherein said hole has a diameter of 5 mm or less.

12. The method of claim 1 wherein said disks are uniformly spaced apart at a distance of 5 mm.

13. The method of claim 1 wherein said disks have data tracks that are rotationally oriented to within ±0.0001 inches of each other.

14. A disk stacking tool for placement on a servo track writing machine for writing data to multiple disks, comprising:
    a cylindrical spindle having a first diameter adapted to receive a plurality of said disks, said spindle including a threaded bore in a top portion thereof;
    a cylindrical base coupled to the spindle and having a second diameter that is greater than the first diameter, said base including a bottom hole for engagement with said servo track writing machine;
    a clamp having a detent for engaging said top portion of said spindle to secure said disks to said spindle; and
    a threaded bolt adapted to couple through said clamp to engage said threaded bore to lock said clamp in place.

15. The disk stacking tool of claim 14 wherein said spindle has a uniform diameter of 0.1968 inches and a tolerance of ±0.0001 inches.

16. The disk stacking tool of claim 14 wherein said base has a diameter of 1.2 inches and a tolerance of ±0.01 inches.

17. The disk stacking tool of claim 14 wherein said base includes screw holes positioned 120 degrees apart through a top surface of said base, said base crew holes configured to receive screws to couple into a grind fixture between the base and said servo track writing machine.

18. The disk stacking tool of claim 14 wherein said clamp includes screw holes positioned 120 degrees apart through a top surface thereof, said screw holes configured to receive screws that couple and align said clamp to said disks.

19. The disk stacking tool of claim 14, further comprising a plurality of spacing tools for placement over one of said disks, each spacing tool having an extrusion to engage and align said disk.

20. The disk stacking tool of claim 14 wherein said disks are adapted to be uniformly spaced apart at a distance of 5 mm.

* * * * *